(12) United States Patent
Zhang

(10) Patent No.: US 6,687,311 B1
(45) Date of Patent: Feb. 3, 2004

(54) DIRECT QAM MODULATOR WITH DIGITAL FEEDBACK CONTROL AND COMPLEX PRE-EQUALIZATION FOR PHASE AND AMPLITUDE DISTORTION

(75) Inventor: Qin Zhang, Bensalem, PA (US)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 09/504,529

(22) Filed: Feb. 15, 2000

(51) Int. Cl.$^7$ .............................. H04L 27/36
(52) U.S. Cl. ................. 375/298; 375/296; 375/308; 332/103
(58) Field of Search ................. 375/296, 298, 375/216, 261, 281, 308; 332/103, 144, 145; 455/108

(56) References Cited

U.S. PATENT DOCUMENTS

| | | | |
|---|---|---|---|
| 5,293,406 A | * | 3/1994 | Suzuki ................. 375/295 |
| 5,852,389 A | * | 12/1998 | Kumar et al. .......... 332/103 |
| 6,246,286 B1 | * | 6/2001 | Persson ................. 330/149 |

* cited by examiner

Primary Examiner—Young T. Tse
Assistant Examiner—David B. Lugo
(74) Attorney, Agent, or Firm—Barry R. Lipsitz; Douglas M. McAllister

(57) ABSTRACT

A direct quadrature amplitude modulation (QAM) modulator provides amplitude and phase pre-equalization to reduce complexity and cost. In-phase (I) and quadrature-phase (Q) QAM signal components are provided from an analog modulator. A radio-frequency (RF) driver provides a RF signal with the QAM components. A monitoring device monitors phase and amplitude errors in the RF signal, and provides a feedback signal to a digital complex phase and amplitude equalizer embedded in a digital Nyquist filter. The equalizer uses the feedback signal to provide a pre-equalizing signal to a digital-to-analog converter, which provides a corresponding analog equalizing signal. This signal is, in turn, low-pass filtered and fed back to the analog I/Q modulator to equalize the phase and amplitude of the I and Q components there. The invention is particularly suitable for generating 64/256-QAM signals in the 50 MHz-880 MHz range without an Intermediate Frequency (IF) stage and double-conversion, and may be used, e.g., for communicating digital television data via a cable network.

20 Claims, 5 Drawing Sheets

DIRECT QAM MODULATOR WITH DIGITAL FEEDBACK CONTROL AND COMPLEX PRE-EQUALIZATION FOR PHASE AND AMPLITUDE DISTORTION

BACKGROUND OF THE INVENTION

The present invention relates to a direct Quadrature Amplitude Modulation (QAM) modulator that uses advanced digital signal processing techniques and feedback control. The invention is particularly suitable for generating 64/256-QAM signals in the 50 MHz-880 MHz range without an Intermediate Frequency (IF) stage and double-conversion, and may be used, e.g., for communicating digital television data via a cable network.

The following acronyms and terms are used:
ASIC—Application-Specific Integrated Circuits
D/A—Digital-to-Analog
DSP—Digital Signal Processor
EM—Electro-Magnetic
EMC—Electro-Magnetic Compatibility
EMI—Electro-Magnetic Interference
I/Q—In-phase/Quadrature-phase.
IF—Intermediate Frequency
LO—Local Oscillator
MPS—Modular Processing System
PLL—Phase-Locked Loop
QAM—Quadrature Amplitude Modulation
QPSK—Quadrature Phase-Shift Keying
RF—Radio Frequency
RMS—Root Mean Square
SAW—Surface Acoustic Wave QAM modulation is commonly used, for example, in many existing cable television network headends, as well as many other possible uses.

FIG. 1 illustrates a conventional double-conversion QAM modulator 100, which includes a modulator portion 102 and an up-converter portion 172. With current systems, a digital modulator 105 in a device termed a MPS generates a QAM signal at an IF, such as a 44 MHz or 36 MHz international standard.

The digital signal output from the modulator 105 passes through a D/A converter 110, a low-pass filter 115, an IF amplifier 120, a SAW filter 125, an IF amplifier 130, and an, IF output driver 140.

An external up-converter 172 receives the IF signal from the IF output driver 140 and translates the IF signal to a RF signal. The up-converter 172 includes a 1.3 GHz mixer 145, a 1.3 GHz band-pass filter 150, a 1.3–2.16 GHz mixer 155, a band-pass filter 160, a RF driver 165 and a 50 to 880 MHz coupler 170 which provides an output signal on line 180. A monitor 175 monitors an output of the coupler 170.

This IF-RF approach requires a two-stage RF converter (the so-called "double-conversion" technology). Thus, in such current modulators, one digital modulator 105 and a two-stage analog converter are used. That is, the up-converter 172 has two stages—mixers 145 and 155.

However, the conventional modulation approaches have a number of disadvantages, including:

(1) This technology requires two high frequency local oscillators 145 and 155. There are several disadvantages associated with these local oscillators (mixers) 145 and 155. First, they require more materials, board space and power supply. In addition to cost issues, high frequency signals are a source of EMI and EMC problems. Additional L-band conversion introduces phase noise to the modulated signal. Double-conversion increases manufacturing difficulty and reduces product reliability. In this configuration, the SAW filter has—20 dB attenuation. More amplifiers are required to compensate the filter loss. To control the phase noise, each LO 145, 155 has to be phase locked to a reference source using a PLL. Active filters are required for the PLL to provide a good frequency resolution and to reduce RMS phase errors.

(2) The IF output requires the SAW filter 125 to filter out spurious images and harmonics. However, the SAW filter 125 introduces a significant attenuation, such as—20 dB. Accordingly, more amplifiers (e.g., amplifiers 120, 130) are required to compensate for the amplitude loss due to the SAW filter 125. Moreover, these amplifiers 120, 130 have to be adjusted to balance harmonic distortion and signal-to-noise ratio. In the conventional QAM design tested by the inventor, a one-stage amplifier 120 was used to drive the SAW filter 125 and three more stages of amplifiers (in amplifier function 130) on the output to increase the output level to the required level. The second IF amplifier (1.3 GHz) 130 also required multi-stage filtering (in the band-pass filter 150) to remove the image and harmonics. Buffers and amplifiers were also required for these filters.

(3) EMI and EMC are very important issues with high-frequency LOs and mixers. Specifically, very good EM shields are required for all oscillators, mixers and filters. However, these shields not only require circuit board space, but also add difficulties and expense to manufacturing and trouble-shooting.

(4) Double-conversion introduces additional phase noise into the QAM signal.

(5) Double-conversion reduces product reliability.

(6) The cost for modulating each channel is very high—approximately 1,200 —for conventional modulation and upconversion technology.

(7) Separate boxes (e.g., packaging) for the modulator 102 and upconverter 172 make status monitoring, operation control and redundancy control more complicated.

Accordingly, it would be desirable to provide a digital modulation technology that addresses the above problems.

The system should provide improved performance over conventional modulators, and should be implementable in a more compact design and at a lower cost.

The system should provide combined modulation and upconversion in a single package for applications such as digital cable television transmission.

The system should be implementable using off-the-shelf DSP and ASIC devices.

The present invention provides a system having the above and other advantages.

SUMMARY OF THE INVENTION

The present invention relates to a direct QAM modulator.

A direct quadrature amplitude modulation (QAM) modulator in accordance with the invention provides amplitude and phase pre-equalization to reduce complexity and cost. In-phase (I) and quadrature-phase (Q) QAM signal components are provided from an analog modulator. A radio-frequency (RF) driver provides a RF signal with the QAM components. A monitoring device monitors phase and/or amplitude errors in the RF signal, and provides a corresponding signal to a digital complex phase and amplitude equalizer embedded in a digital Nyquist filter. The equalizer uses the feedback signal to provide a pre-equalizing signal to a digital-to-analog converter, which provides a corresponding analog equalizing signal. This signal is, in turn, low-pass filtered and fed back to the analog I/Q modulator to equalize the phase and/or and amplitude of the I and Q components there.

The invention is particularly suitable for generating 64/256-QAM signals in the 50 MHz-880 MHz range without an Intermediate Frequency (IF) stage and double-conversion, and may be used, e.g., for communicating digital television data via a cable network.

DETAILED DESCRIPTION OF THE INVENTION

The present invention relates to a direct QAM modulator.

Figure 1:
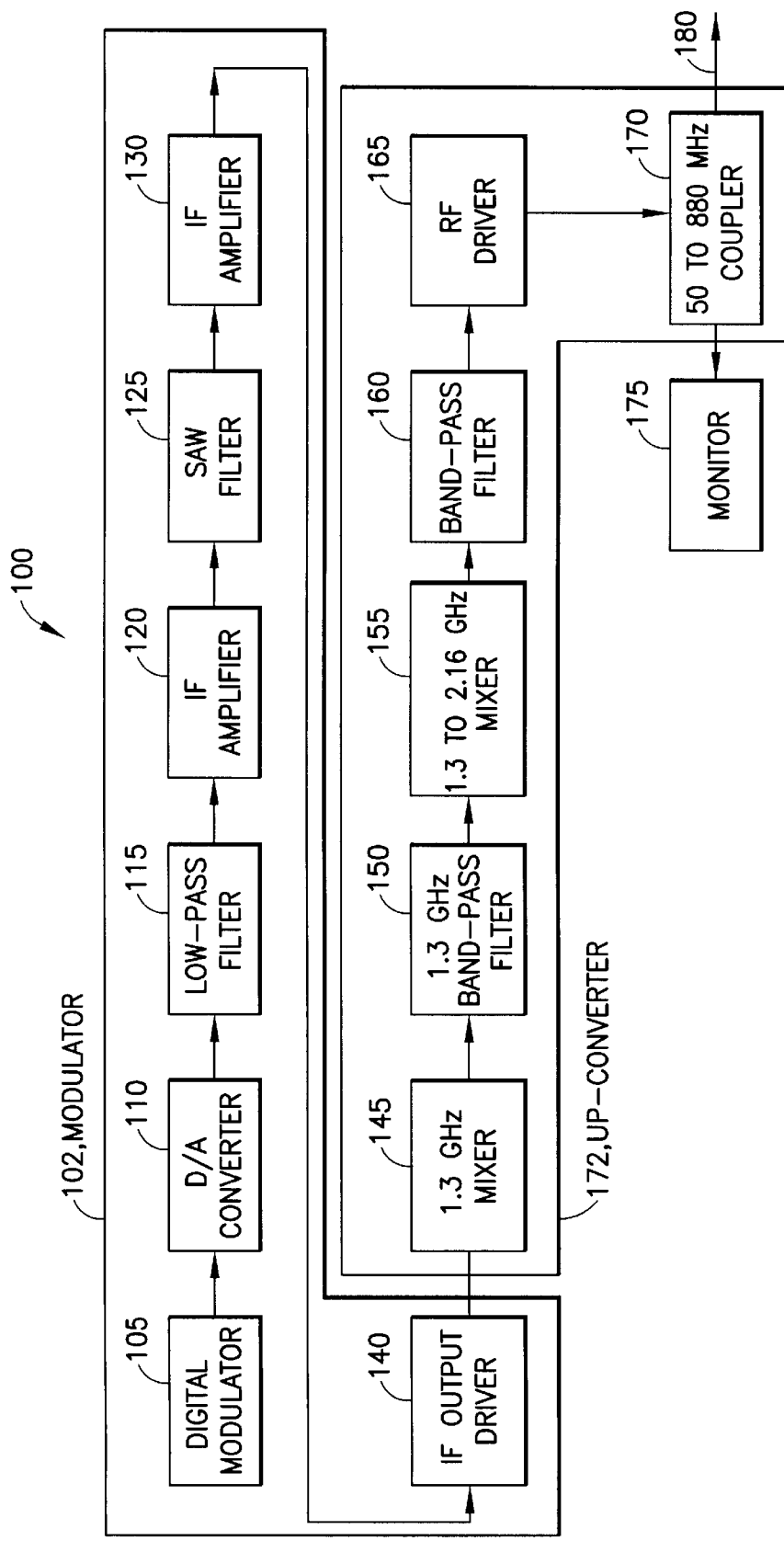
FIG. 1 illustrates a conventional double-conversion QAM modulator.
Figure 2:
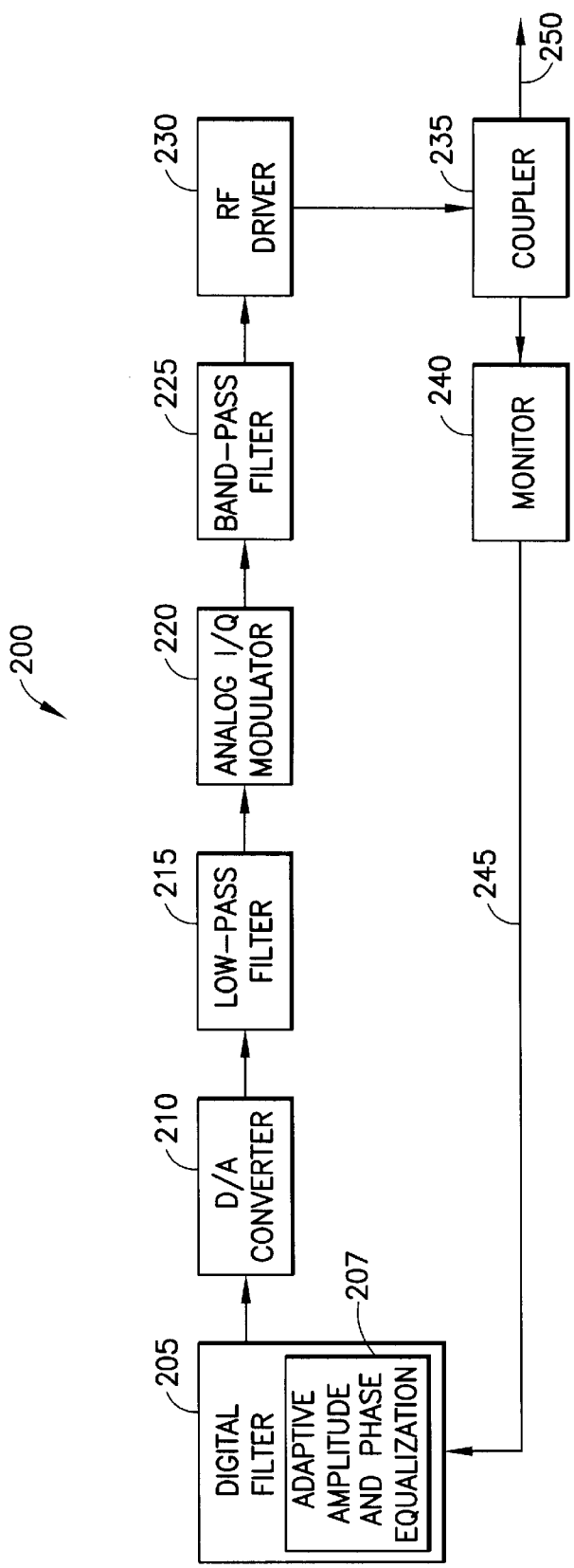
FIG. 2 illustrates a direct QAM modulator in accordance with the present invention.

FIG. 2 illustrates a direct QAM modulator in accordance with the present invention.

The invention uses a direct modulation technology that does not require multiple IF stages and double-conversion technology.

A key technology in this new structure is a digital complex phase and amplitude equalizer 207 embedded in a digital Nyquist filter 205. This approach requires no additional parts on the circuit board compared to the conventional approach.

A digital equalizing signal from the equalizer 207 is processed at a D/A converter to provide a corresponding analog equalizing signal, which is, in turn, low-pass filtered at a filter 215, and fed back to an analog I/Q modulator to equalize the phase and amplitude of the I and Q components there.

Phase and amplitude errors introduced by an analog I/Q modulator 220 can be compensated by the digital pre-equalization filter 205. Without digital pre-equalization, the current analog I/Q modulator 220 is only good for QPSK modulation.

The equalized I and Q components from the modulator 220 are filtered at a band-pass filter 225, and provided to a RF driver 230, which provides a corresponding QAM RF signal with I and Q components. A coupler couples the RF signal out via a line 250, and to a monitor 240. The monitor 240 monitors the amplitude and phase of the RF signal and provides corresponding amplitude and phase adjustment information. This information is sent to the digital filter 205 for use by the equalizer 207 via a feedback path 245.

Since the direct QAM modulator 200 does not use an IF stage, there are no images in the output of the modulator 220. Moreover, without the IF stage, the output band-pass filter 225 is much easier to manufacture. This structure does not require the double-conversion technology.

Moreover, the output of the band-pass filter 225 is much easier to build.

Additionally, the direct QAM modulator 200 can be built very compactly. Because no L-band signal is involved, the filter and mixer are uncomplicated. In fact, it is estimated that one MPS card can accommodate two complete QAM channels, with a cost for each channel under $400, which is ⅓ the cost of the conventional design.

For production, the complex equalizer 207 can be calibrated by an automatic DSP card, or can be combined with the monitoring circuit 240.

The combined modulation and upconversion enables the MPS to offer a one-box, cost-effective solution for digital cable transmission.

Table 1 provides a performance and complexity comparison of a conventional design versus the direct modulation design of the present invention.

TABLE 1

| Feature: | Conventional Design | Direct Modulation |
| --- | --- | --- |
| Phase Noise | Acceptable | Excellent |
| Modulation Error | Good | Good |
| Manufacturing | Very Complicated | Easy |
| Reliability | Acceptable | Excellent |
| Calibration and Tuning | Complicated | Automated or Self-calibrated |
| Oscillators | 3 | 1 |
| PLLs | 3 | 1 |
| Mixers | 3 | 1 |
| SAW filters | 1 | 0 |
| 1.3 GHz IF Filters | Up To 3 | 0 |
| IF amplifiers | 4 | 0 |
| RF amplifiers | 5 | 2 |
| Output Driver | 1 | 1 |
| EMI Shielding and Filters | Complicated | Simple |
| Monitor | Separate for QAM and Upconverter | 1 |
| Power Consumption | High | Low |
| Cost per Channel | $1,200 | $400 |

Figure 3:
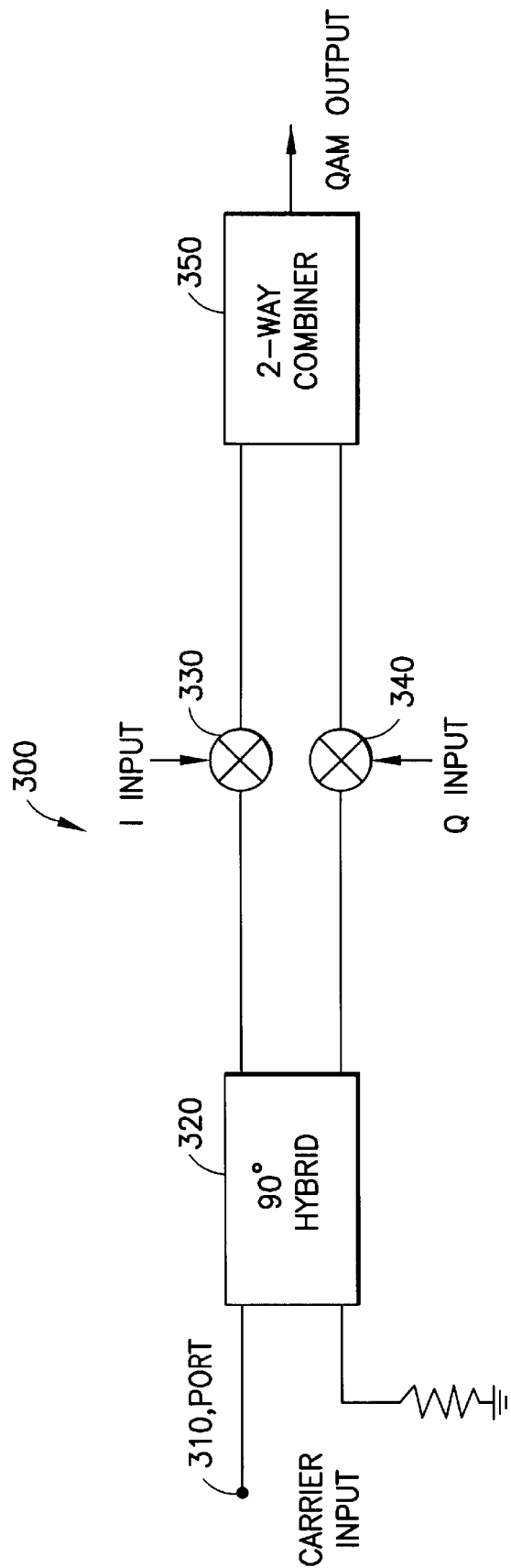
FIG. 3 illustrates a RF physical model of a direct QAM Modulator in accordance with the present invention.

FIG. 3 illustrates a RF physical model of a direct QAM Modulator 300 in accordance with the present invention.

A high frequency carrier is presented to a port 310 in a 90-degree hybrid 320. The outputs from the hybrid 320 are carriers with a 90-degree phase difference. The I and Q baseband signals are modulated by these two RF carriers at modulators 330 and 340, respectively. The outputs from the modulator are combined at a two-way combiner 350 to form the QAM RF output signal.

The distortion introduced by the QAM modulator can be transferred from the RF model to a baseband equivalent model, as follows.

Figure 4:
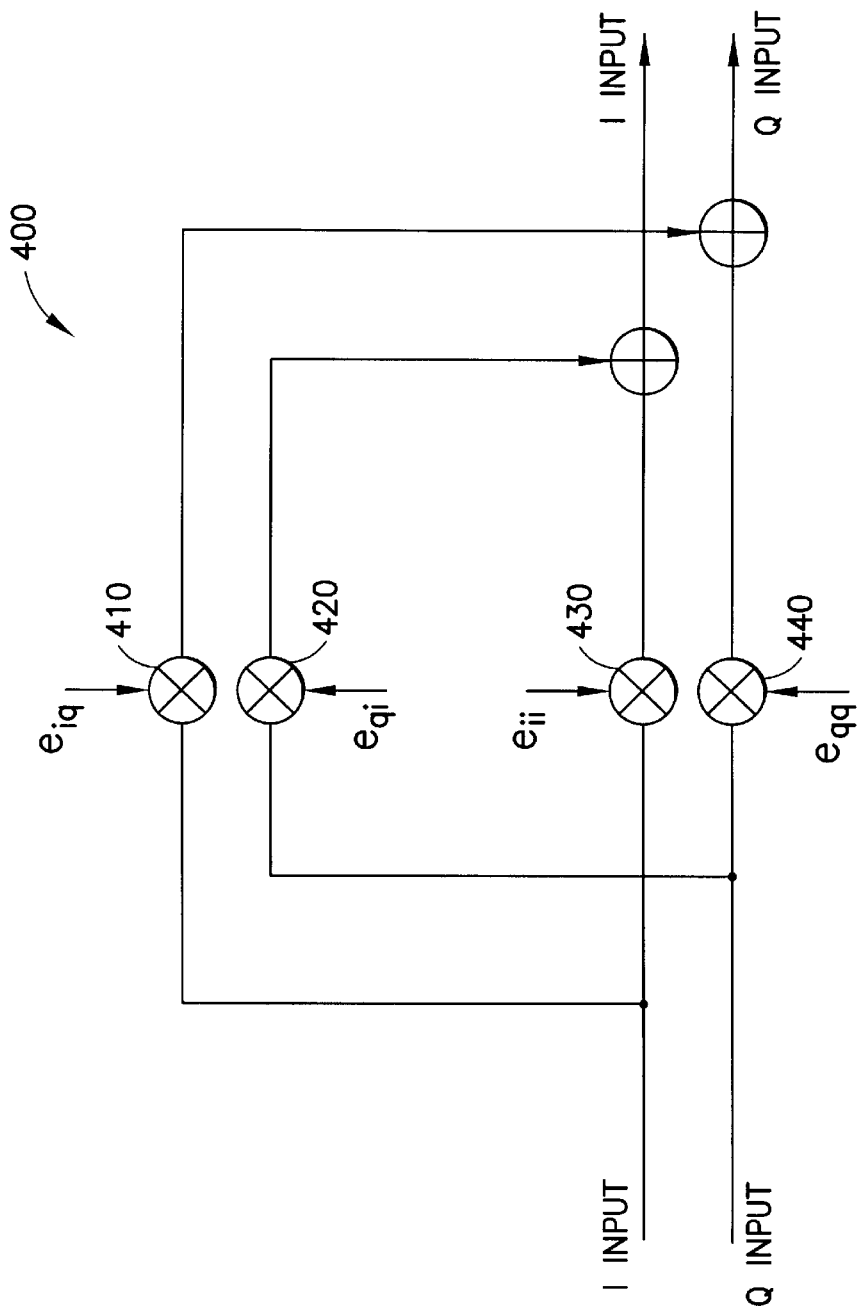
FIG. 4 illustrates a baseband equivalent mathematical model of a direct QAM modulator in accordance with the present invention.

FIG. 4 illustrates a baseband equivalent mathematical model of a direct QAM modulator in accordance with the present invention.

In the model 400, the model coefficients $e_{ii}$, $e_{iq}$, $e_{qi}$, and $e_{qq}$ are determined by the QAM modulator and the 90-degree hybrid. These coefficients can be determined by indirect measurement in a vector demodulator system. However, in production these values are generally unknown. A pre-equalization system must be able to, blindly equalize these parameters without any measurement results of these parameters.

The I input is modulated by $e_{iq}$ at a modulator 410, and by $e_{ii}$ at a modulator 430. Similarly, the Q input is modulated by $e_{iq}$ at a modulator 420, and by $e_{qq}$ at a modulator 440.

Figure 5:
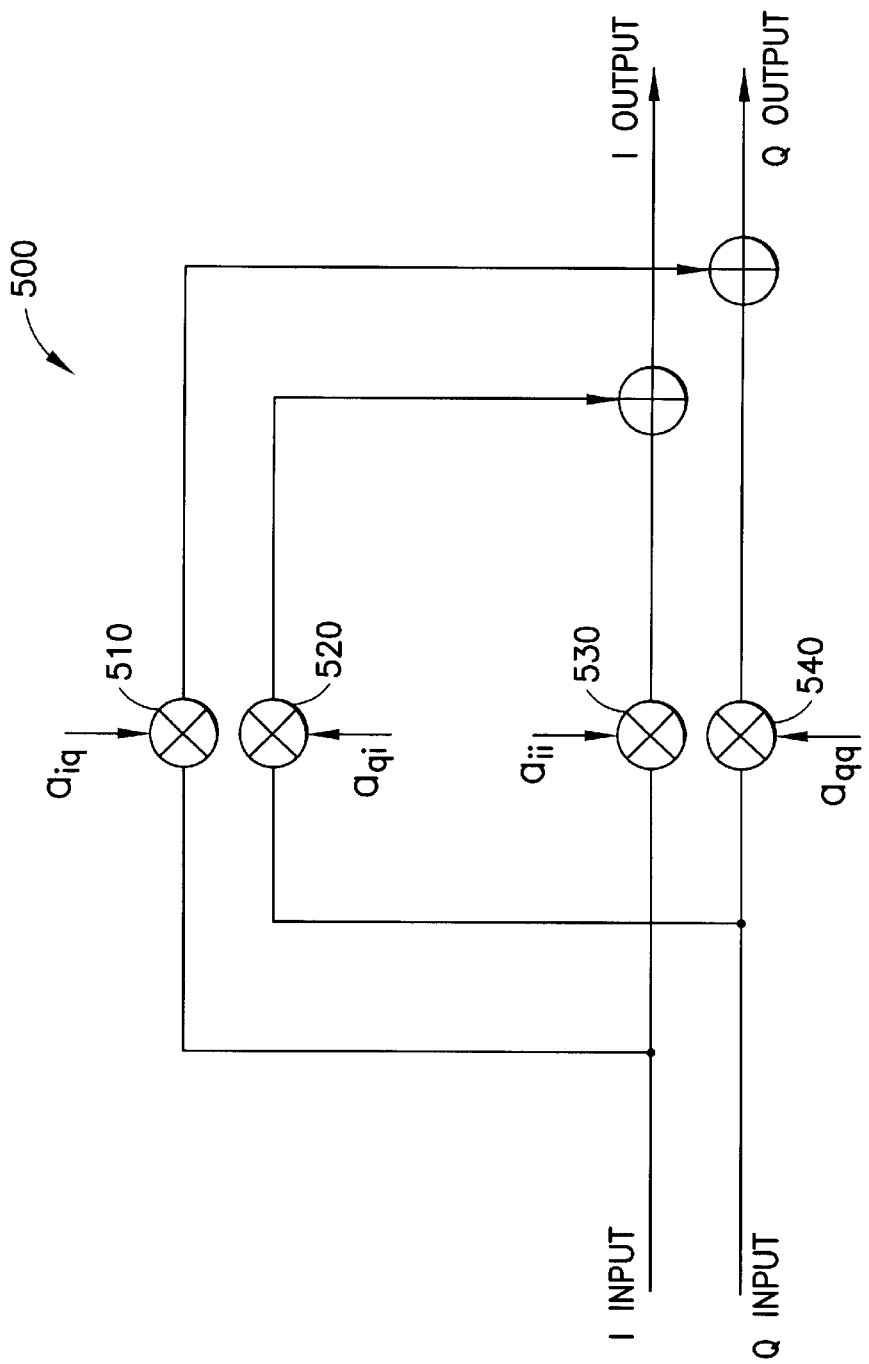
FIG. 5 illustrates a quadrature phase and amplitude equalizer in accordance with the present invention.

FIG. 5 illustrates a quadrature phase and amplitude equalizer (pre-equalizer structure) in accordance with the present invention.

A digital complex equalizer 500 is used in this invention to correct the amplitude and phase distortion introduced by the modulator and the 90-degree hybrid. The complex equalizer has four coefficients, $a_{ii}$, $a_{iq}$, $a_{qi}$, and $a_{qq}$. The equalizer coefficients are derived by a digital QAM demodulator. An off-the-shelf digital demodulator or a digital signal processor can be used to derive the equalization coefficients.

The I input is modulated by a at a modulator 510, and by $a_{ii}$, at a modulator 530. Similarly the Q input is modulated by $a_{qi}$ at a modulator 520, and by $a_{qq}$ at a modulator 540.

The digital pre-equalizer 500 has a similar topology to the model 400. The equalization coefficients $a_{ii}$, $a_{iq}$, $a_{qi}$, $a_{qq}$, are given by the following three sets of equations:

$$e_{iq} * a_{ii} + e_{qq} * a_{iq} = 0 \quad (1)$$

$$e_{ii} * a_{qi} + e_{qi} * e_{qq} = 0 \quad (2)$$

$$e_{ii} * a_{ii} + e_{qi} * a_{iq} = e_{iq} * a_{qi} + e_{qq} * a_{qq} \quad (3)$$

In the foregoing equations 1, 2 and 3, the coefficients $e_{ii}$, $e_{iq}$, $e_{qq}$, and $e_{iq}$ are unknowns. So, the equation set cannot be solved to find the equalization coefficients $a_{ii}$, $a_{iq}$, $a_{qq}$, and $a_{qi}$. In a system implementation, it is not very important to know the modulator coefficients, since these coefficients will be different from unit to unit in production. With the present invention, the equalization coefficients are found and optimized so that equations 1, 2 and 3 are best approximated. The least mean square (LMS) and the steepest-descent method may be used to find the equalization coefficients $a_{ii}$, $a_{iq}$, $a_{qq}$, and $a_{qi}$. In this method, we first choose:

$$a_{ii} = E_{qq} \quad (4)$$

$$a_{qq} = E_{ii} \quad (5)$$

$$a_{iq} = -E_{iq}/E_{qq} \quad (6)$$

$$a_{qi} = -E_{qi}/E_{qq} \quad (7)$$

where $E_{ii}$, $E_{qq}$, $E_{iq}$, and $E_{qi}$ are average values of $e_{ii}$, $e_{qq}$, $e_{iq}$, and $e_{iq}$ given by manufacturers. The coefficients adaptation equation is given by the following general equation:

$$a(k+1)=a(k)-\Delta.\text{error}(k).x(k), \quad (1)$$

where delta ($\alpha$) is the adaptation step size, a (k+1) is the equalizer coefficient at iteration number k+1, error(k) is the error output at the digital demodulator, and x(k) is the slicer decision output at the digital demodulator.

It should now be appreciated that the present invention provides a new direct QAM modulator. The modulator's baseband equivalent mathematical model and equalization equations are derived. Using direct QAM modulation with amplitude and phase pre-equalization, the complexity and cost of a digital QAM modulator is substantially reduced, thereby resulting in significant savings, e.g., for headend operators.

Although the invention has been described in connection with various specific embodiments, those skilled in the art will appreciate that numerous adaptations and modifications may be made thereto without departing from the spirit and scope of the invention as set forth in the claims.

What is claimed is:

1. A direct quadrature amplitude modulation (QAM) apparatus, comprising:

an analog modulator for providing in-phase and quadrature-phase QAM signal components;

a radio-frequency (RF) driver responsive to said analog modulator for providing a RF signal comprising said QAM signal components;

means for monitoring said RF signal components to provide at least one of phase and amplitude adjustment information therefor;

a digital filter coupled to receive the adjustment information;

said digital filter comprising a digital complex equalizer that is responsive to the adjustment information for providing a digital equalizing signal for compensating at least one of phase and amplitude errors in the analog modulator;

a digital-to-analog converter coupled to receive the digital equalizing signal to provide a corresponding analog equalizing signal; and means for providing the analog equalizing signal to the analog modulator to adjust at least one of the phase and amplitude of the in-phase and quadrature-phase signal components provided thereat.

2. The apparatus of claim 1, wherein:

the monitoring means provides phase adjustment information.

3. The apparatus of claim 1, wherein:

the monitoring means provides amplitude adjustment information.

4. The apparatus of claim 1, wherein:

the monitoring means provides phase and amplitude adjustment information.

5. The apparatus of claim 1, further comprising:

a low-pass filter coupled between the digital-to-analog converter and the modulator for filtering the analog equalizing signal.

6. The apparatus of claim 1, further comprising:

a band-pass filter coupled between the modulator and the RF driver for filtering the in-phase and quadrature-phase QAM signal components.

7. The apparatus of claim 1, further comprising:

a coupler for receiving the RF signal and providing it as an output signal on one path, and to said monitoring means on a second path.

8. The apparatus of claim 1, wherein:

the QAM signal components comprise one of 64-and 256-QAM signal components.

9. The apparatus of claim 1, wherein:

the RF signal is in a range of approximately 50 MHz to 880 MHz.

10. The apparatus of claim 1, wherein:

said digital filter comprises a Nyquist filter.

11. A direct quadrature amplitude modulation (QAM) method, comprising the steps of:

providing in-phase and quadrature-phase QAM signal components at an analog modulator;

providing a RF signal comprising said QAM signal components;

monitoring said RF signal components to provide at least one of phase and amplitude adjustment information therefor;

receiving the adjustment information at a digital filter;

providing a digital complex equalizer at the digital filter that is responsive to the adjustment information for providing a digital equalizing signal for compensating at least one of phase and amplitude errors in the analog modulator;

performing digital-to-analog conversion on the digital equalizing signal to provide a corresponding analog equalizing signal; and providing the analog equalizing signal to the analog modulator to adjust at least one of the phase and amplitude of the in-phase and quadrature-phase signal components provided thereat.

12. The method of claim 11, wherein:

said monitoring step provides phase adjustment information.

13. The method of claim 11, wherein:

said monitoring step provides amplitude adjustment information.

14. The method of claim 11, wherein:

said monitoring step provides phase and amplitude adjustment information.

15. The method of claim 11, comprising the further step of:

low-pass filtering the analog equalizing signal prior to providing it to the analog modulator.

16. The method of claim 11, comprising the further step of:

band-pass filtering the in-phase and quadrature-phase QAM signal components provided at the analog modulator prior to providing the RF signal.

17. The method of claim 11, further comprising:

receiving the RF signal and providing it as an output signal on one path, and to a monitoring means for said monitoring step on a second path.

18. The method of claim 11, wherein:

the QAM signal components comprise one of 64-and 256-QAM signal components.

19. The method of claim 11, wherein:

the RF signal is in a range of approximately 50 MHz to 880 MHz.

20. The method of claim 11, wherein:

the digital filter comprises a Nyquist filter.

* * * * *